US 10,909,076 B2

(12) United States Patent
Yamazaki

(10) Patent No.: US 10,909,076 B2
(45) Date of Patent: Feb. 2, 2021

(54) MANAGEMENT UNIT EXISTENCE DETERMINATION SYSTEM AND MANAGEMENT UNIT EXISTENCE DETERMINATION PROGRAM

(71) Applicant: LAC CO., LTD., Tokyo (JP)

(72) Inventor: Keigo Yamazaki, Tokyo (JP)

(73) Assignee: LAC CO., LTD., Tokyo (JP)

( * ) Notice: Subject to any disclaimer, the term of this patent is extended or adjusted under 35 U.S.C. 154(b) by 674 days.

(21) Appl. No.: 15/457,078

(22) Filed: Mar. 13, 2017

(65) Prior Publication Data
US 2017/0185618 A1 Jun. 29, 2017

Related U.S. Application Data

(63) Continuation-in-part of application No. PCT/JP2015/073686, filed on Aug. 24, 2015.

(51) Int. Cl.
 G06F 16/14 (2019.01)
 G06F 21/56 (2013.01)
 G06F 21/62 (2013.01)

(52) U.S. Cl.
 CPC .......... *G06F 16/148* (2019.01); *G06F 21/56* (2013.01); *G06F 21/6218* (2013.01)

(58) Field of Classification Search
 CPC ......... G06F 16/148; G06F 16/11; G06F 16/14
 See application file for complete search history.

(56) References Cited

U.S. PATENT DOCUMENTS

| 7,577,686 | B1* | 8/2009 | Larkin | G06F 9/45537 |
| | | | | 707/999.104 |
| 9,571,509 | B1* | 2/2017 | Satish | G06F 21/566 |
| 9,690,933 | B1* | 6/2017 | Singh | G06F 21/56 |
| 2010/0312783 | A1* | 12/2010 | Brady | G06F 16/128 |
| | | | | 707/769 |

(Continued)

FOREIGN PATENT DOCUMENTS

JP 2011-221892 11/2011

OTHER PUBLICATIONS

Korean Office Action issued for Korean Patent Application No. 10-2017-7006727 dated Mar. 22, 2018 along with an English translation thereof.

(Continued)

*Primary Examiner* — Ashish Thomas
*Assistant Examiner* — Jedidiah P Ferrer
(74) *Attorney, Agent, or Firm* — Greenblum & Bernstein, P.L.C.

(57) ABSTRACT

A management unit existence determination system includes: a query transmitter configured to transmit a first query, in which management unit information indicating a management unit is included, and at least one second query, in which a part of the management unit information is changed is included, which are queries for confirming an existence of the management unit of a file management system, to a determination target apparatus; a receiver configured to receive a response to the first query and a response to the second query from the determination target apparatus; and a determiner configured to determine whether the management unit exists by comparing the response to the first query with the response to the second query received by the receiver.

7 Claims, 6 Drawing Sheets

(56) References Cited

U.S. PATENT DOCUMENTS

2011/0078117 A1*  3/2011  Ishii .................... G06F 11/1451
                                                707/640
2015/0356106 A1* 12/2015  Hendrey ............... G06F 16/319
                                                707/706

OTHER PUBLICATIONS

"phpMyAdmin Code Injection RCE Scanner and Exploit", CVE-2009-1151. Webapps exploit for php platform, (Jun. 2009).
Occupytheweb, Hack Like Pro: "How to Find Directories in Websites Using DirBuster", (Sep. 2014).
Search Report issued in International Patent Application No. PCT/JP2015/073686, dated Nov. 2, 2015.

* cited by examiner

FIG. 4

IMU

| NO | MANAGEMENT UNIT POSITION INFORMATION IMA |
|---|---|
| 1 | phpMyAdmin |
| 2 | test.cgi |
| 3 | htaccess |
| 4 | admin/cgi-bin/admin.php |
| 5 | admin |
| ⋮ | ⋮ |

FIG. 5

|  | REFERENCE | MANAGEMENT UNIT MU |
|---|---|---|
| PERMISSION RESPONSE PR | POSSIBLE | PRESENT |
| MOVEMENT RESPONSE MR | IMPOSSIBLE | NOT PRESENT |
| CERTIFICATION RESPONSE CR | IMPOSSIBLE | PRESENT |
| REJECTION RESPONSE RR | IMPOSSIBLE | PRESENT |
| NON-EXISTENCE RESPONSE NER | IMPOSSIBLE | NOT PRESENT |

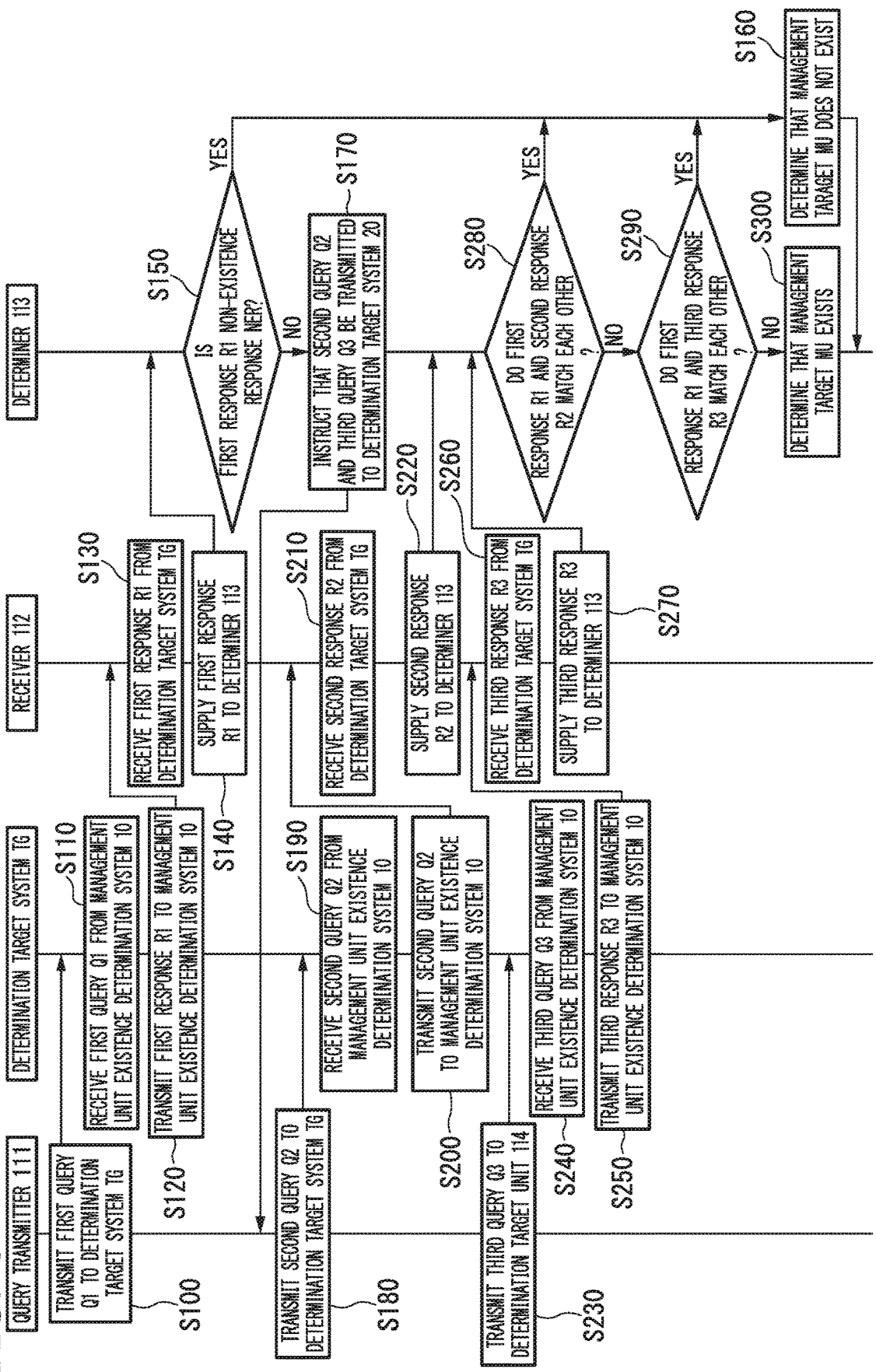

MANAGEMENT UNIT EXISTENCE DETERMINATION SYSTEM AND MANAGEMENT UNIT EXISTENCE DETERMINATION PROGRAM

CLAIM FOR PRIORITY

This application is a Continuation-In-Part of PCT/JP2015/073686 filed Aug. 24, 2015, the contents of which are expressly incorporated by reference herein in their entireties.

BACKGROUND

Technical Fields

Embodiments of the present invention generally relate to a management unit existence determination system and a management unit existence determination program.

Related Art

With the recent spread of the Internet, threats existing on a network have increased to such a degree that they cannot be ignored. A malignant program is one of such threats on a network. Such a malignant program is referred to as "malware," and represents a malicious program that is unfavorable to a user. A so-called computer virus is a representative of malware.

Malware that actively spreads infection through a network has been frequently confirmed as such malware. For example, there is a type of malware that massively spreads infection at once by e-mail or the like. However, recently, as an operating system (OS) in which a personal firewall is basically equipped has spread, damage due to such an "active attack" type of malware has been less noticeable than before.

Meanwhile, a "passive attack" type of malware using websites has rapidly increased these days. For example, in a case in which vulnerability exists in a web server, malware may be installed by tampering.

Further, in a case in which vulnerability exists in a web server, a malicious command may be executed on the web server, or information stored in a server may be stolen.

Even in a case in which a user takes care so as not to access a "doubtful website," examples in which damage occurs due to vulnerability of the web server are increasing because even a web page of a general company that should be safe may be rewritten.

In order to prevent such damage due to vulnerability of a web page through the web page, it is necessary to sequentially determine whether the web page is vulnerable. Here, as a method for determining vulnerability of a web server, a method for determining whether an application that may cause vulnerability to a web server exists is known. In this method, a request is transmitted to a web server on the basis of a list of file names or directory names of applications that may cause vulnerability. Thus, it is determined whether an application that may cause vulnerability exists on the basis of a response received from the web server.

In a related art, Japanese Unexamined Patent Application, First Publication No. 2011-221892 discloses a technique that determines whether an application exists on the basis of a response received with respect to a request transmitted to a web server.

Here, there is a case in which a web server transmits a response indicating that an application exists by responding to a specific character included in a list of file names and directory names of applications included in a request. In this case, in the related art, there is a case in which it is difficult to accurately determine whether content such as an application exists.

SUMMARY

In some embodiments, a management unit existence determination system may include, but is not limited to, a query transmitter, a receiver, and a determiner. The query transmitter may be configured to transmit a first query and at least one second query to a determination target apparatus. The first query includes a management unit information which indicates a management unit of a file management system. The file management system may be configured to respond to query in response to at least a part of a management unit name of the management unit. The first query is to confirm the existence of the management unit of the file management system. The second query includes a partially changed management unit information which has been changed in the at least part of the management unit name from the management unit information. The receiver may be configured to receive a response to the first query and a response to the second query from the determination target apparatus. The determiner may be configured to compare the response to the first query with the response to the second query determine and to determine the existence of the management unit based on a result of the comparison.

BRIEF DESCRIPTION OF THE DRAWINGS

FIG. 4 is a table representing an example of management unit information according to the present embodiment.

FIG. 5 is a table representing an example of determination of a determiner according to the present embodiment.

FIG. 6 is a flowchart representing an example of an operation of the management unit existence determination system according to the present embodiment.

DETAILED DESCRIPTION OF THE EMBODIMENTS

Figure 1:
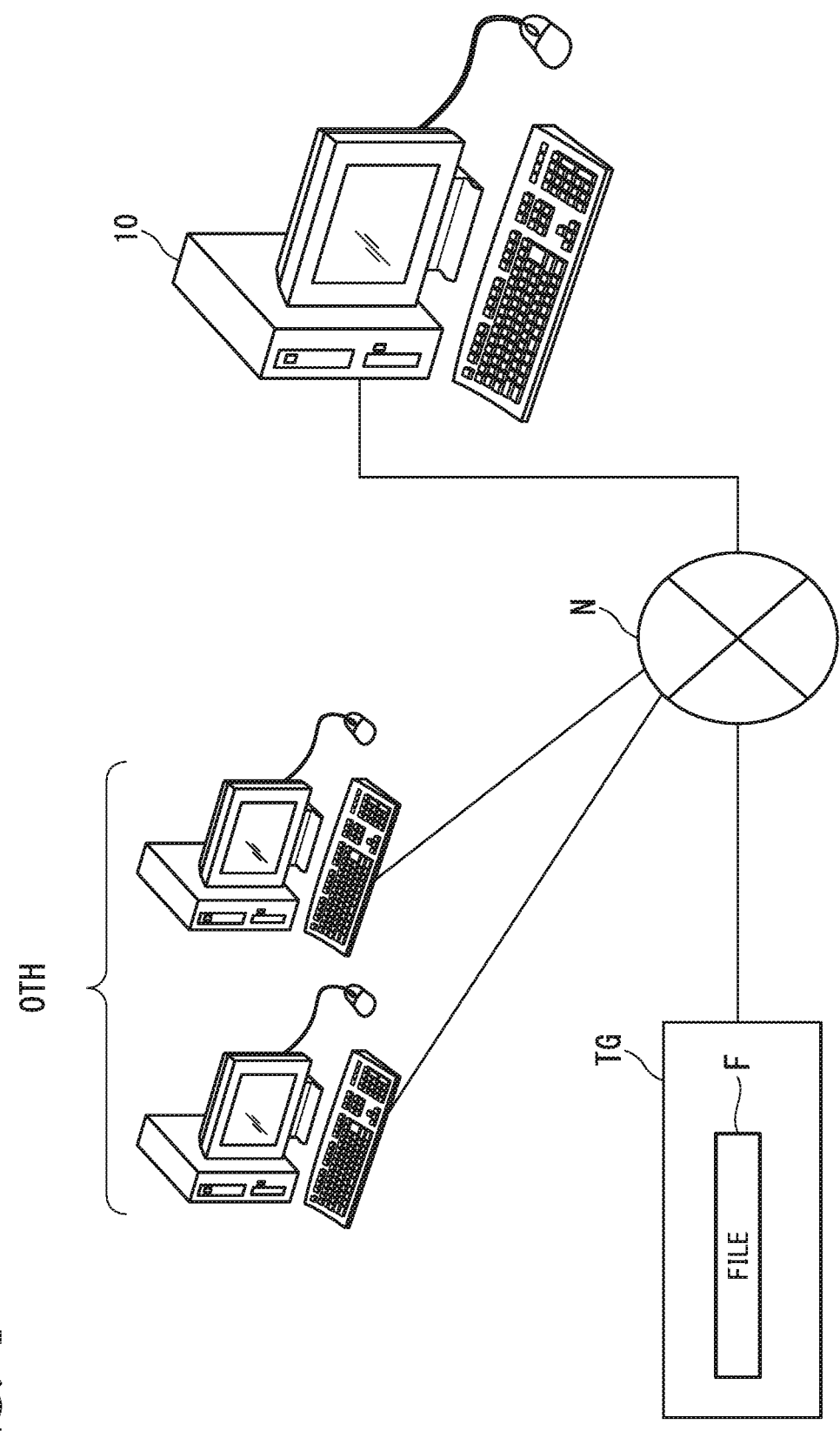
FIG. 1 is a schematic diagram representing an example of a configuration of a management unit existence determination system according to a present embodiment.

In some embodiments, a management unit existence determination system may include, but is not limited to, a query transmitter, a receiver, and a determiner. The query transmitter may be configured to transmit a first query and at least one second query to a determination target apparatus. The first query includes a management unit information which indicates a management unit of a file management system. The file management system may be configured to respond to query in response to at least a part of a management unit name of the management unit. The first query is to confirm the existence of the management unit of the file management system. The second query includes a partially changed management unit information which has been changed in the at least part of the management unit name from the management unit information. The receiver may be configured to receive a response to the first query and a response to the second query from the determination target apparatus. The determiner may be configured to compare the response to the first query with the response to the second query determine and to determine the existence of the management unit based on a result of the comparison.

In some cases, the at least one second query may include, but is not limited to, a query including a first partially changed management unit information which has been changed in a first part of the management unit name from the management unit information; and a query including: a second partially changed management unit information which has been changed in a second part of the management unit name from the management unit information, wherein the second part being different from the first part.

In some cases, the at least part of the management unit name is at least one of first and last elements of the management unit name.

In some cases, the management unit includes one or more groups. Each of the one or more groups includes one or more elements. The second query includes a partially changed management unit information which has been changed in one of the first and last elements of a group of the one or more groups from the management unit information. The first and last elements may typically be header and footer, respectively.

In some cases, the management unit includes one or more groups. Each of the one or more groups includes one or more elements. A first element of the group of the one or more groups is a specific element. The second query includes a partially changed management unit information which has been changed in a second element next to the first element of the group of the one or more groups from the management unit information.

In some cases, the management unit includes one or more groups. Each of the one or more groups includes one or more elements. A last element of the group of the one or more groups is a specific element. The second query includes a partially changed management unit information which has been changed in a last second element next to the last element of the group of the one or more groups from the management unit information.

In other embodiments, a management unit existence determination method may include, but is not limited to, transmitting a first query and at least one second query to a determination target apparatus. The first query includes a management unit information which indicates a management unit of a file management system. The file management system may be configured to respond to query in response to at least a part of a management unit name of the management unit, the first query being to confirm the existence of the management unit of the file management system. The second query includes a partially changed management unit information which has been changed in the at least part of the management unit name from the management unit information. The method further include, but is not limited to, receiving a response to the first query and a response to the second query from the determination target apparatus; comparing the response to the first query with the response to the second query determine; and determining the existence of the management unit based on a result of the comparison.

In other embodiments, a non-transitory computer-readable storage medium which stores a computer program, when executed by a computer, to cause the computer to perform at least: comparing a response to a first query with a response to a second query, and determining the existence of the management unit based on a result of the comparison. The first query includes a management unit information which indicates a management unit of a file management system. The file management system may be configured to respond to query in response to at least a part of a management unit name of the management unit. The first query is to confirm the existence of the management unit of the file management system. The second query includes a partially changed management unit information which has been changed in the at least part of the management unit name from the management unit information.

In other embodiments, a management unit existence determination system may include, but is not limited to, a query transmitter, a receiver, and a determiner. The query transmitter may be configured to transmit a first query and at least one second query to a determination target apparatus. The first query includes a management unit information which indicates a management unit of a file management system. The first query is to confirm the existence of the management unit of the file management system. The second query includes a partially changed management unit information which has been changed in part from the management unit information. The receiver may be configured to receive a response to the first query and a response to the second query from the determination target apparatus. The determiner may be configured to compare the response to the first query with the response to the second query determine and to determine the existence of the management unit based on a result of the comparison. The management unit includes one or more groups. Each of the one or more groups includes one or more elements. The second query includes a partially changed management unit information which has been changed in one of the first and last elements of a group of the one or more groups from the management unit information. The file management system has a hierarchy of different hierarchical levels of the management units. Each of the different hierarchical levels includes at least one of the management units. The query transmitter is configured to transmit, to the determination target apparatus, on the basis of a result of the determination made by the determiner for the management unit included in a hierarchical level of the hierarchy, the first query and the second query for the management unit included in at least another hierarchical level than the hierarchical level.

In some cases, the management unit includes one or more groups. Each of the one or more groups includes one or more elements. A first element of the group of the one or more groups is a specific element. The second query includes a partially changed management unit information which has been changed in a second element next to the first element of the group of the one or more groups from the management unit information.

In some cases, the management unit includes one or more groups. Each of the one or more groups includes one or more elements. A last element of the group of the one or more groups is a specific element. The second query includes a partially changed management unit information which has been changed in a last second element next to the last element of the group of the one or more groups from the management unit information.

In other embodiments, a management unit existence determination method may include, but is not limited to, transmitting a first query and at least one second query to a determination target apparatus, wherein the first query including a management unit information which indicates a management unit of a file management system, the first query being to confirm the existence of the management unit of the file management system, the second query including a partially changed management unit information which has been changed in part from the management unit information; receiving a response to the first query and a response to the second query from the determination target apparatus; comparing the response to the first query with the response to the second query; and determining the existence of the management unit based on a result of the comparison. The management unit includes one or more groups. Each of the one or more groups includes one or more elements. The second query includes a partially changed management unit information which has been changed in one of the first and last elements of a group of the one or more groups from the management unit information. The file management system has a hierarchy of different hierarchical levels of the management units. Each of the different hierarchical levels includes at least one of the management units. The transmission is made, to the determination target apparatus, on the basis of a result of the determination made by the determiner for the management unit included in a hierarchical level of the hierarchy, the first query and the second query for the management unit included in at least another hierarchical level than the hierarchical level.

In other embodiments, a non-transitory computer-readable storage medium which stores a computer program, when executed by a computer, to cause the computer to perform at least: comparing a response to a first query with a response to a second query, wherein the first query including a management unit information which indicates a management unit of a file management system, the first query being to confirm the existence of the management unit of the file management system, the second query including a partially changed management unit information which has been changed in part from the management unit information; and determining the existence of the management unit based on a result of the comparison. The management unit includes one or more groups. Each of the one or more groups includes one or more elements. The second query includes a partially changed management unit information which has been changed in one of the first and last elements of a group of the one or more groups from the management unit information. The file management system has a hierarchy of different hierarchical levels of the management units. Each of the different hierarchical levels includes at least one of the management units. The transmission is made, to the determination target apparatus, on the basis of a result of the determination made by the determiner for the management unit included in a hierarchical level of the hierarchy, the first query and the second query for the management unit included in at least another hierarchical level than the hierarchical level.

First Embodiment

Hereinafter, an embodiment of a management unit existence determination system 10 will be described with reference to the accompanying drawings. First, an outline of the management unit existence determination system 10 will be described with reference to FIG. 1.

FIG. 1 is a schematic diagram representing an example of a configuration of the management unit existence determination system 10 according to the present embodiment. As shown in FIG. 1, the management unit existence determination system and a determination target apparatus TG are connected to each other through a network N. The network N is, for example, the Internet or a local area network (LAN).

A file F is stored in the determination target apparatus TG, and the file F can be referred to by other apparatuses OTH which are different apparatuses connected to the network N. The file F is, for example, an HTML file, an image file, or the like. Further, the determination target apparatus TG is, for example, a server apparatus. Specifically, the determination target apparatus TG is, for example, a file server apparatus, a web server apparatus, or the like.

The management unit existence determination system 10 transmits a query Q for confirming whether the file F can be referred to or not to the determination target apparatus TG through the network N. In response to the query Q, the determination target apparatus TG transmits a response R to the management unit existence determination system 10 according to a state of the file F indicated by the query Q. The management unit existence determination system 10 is an apparatus that determines whether or not the file F exists in the determination target apparatus TG on the basis of the response R.

Figure 2:
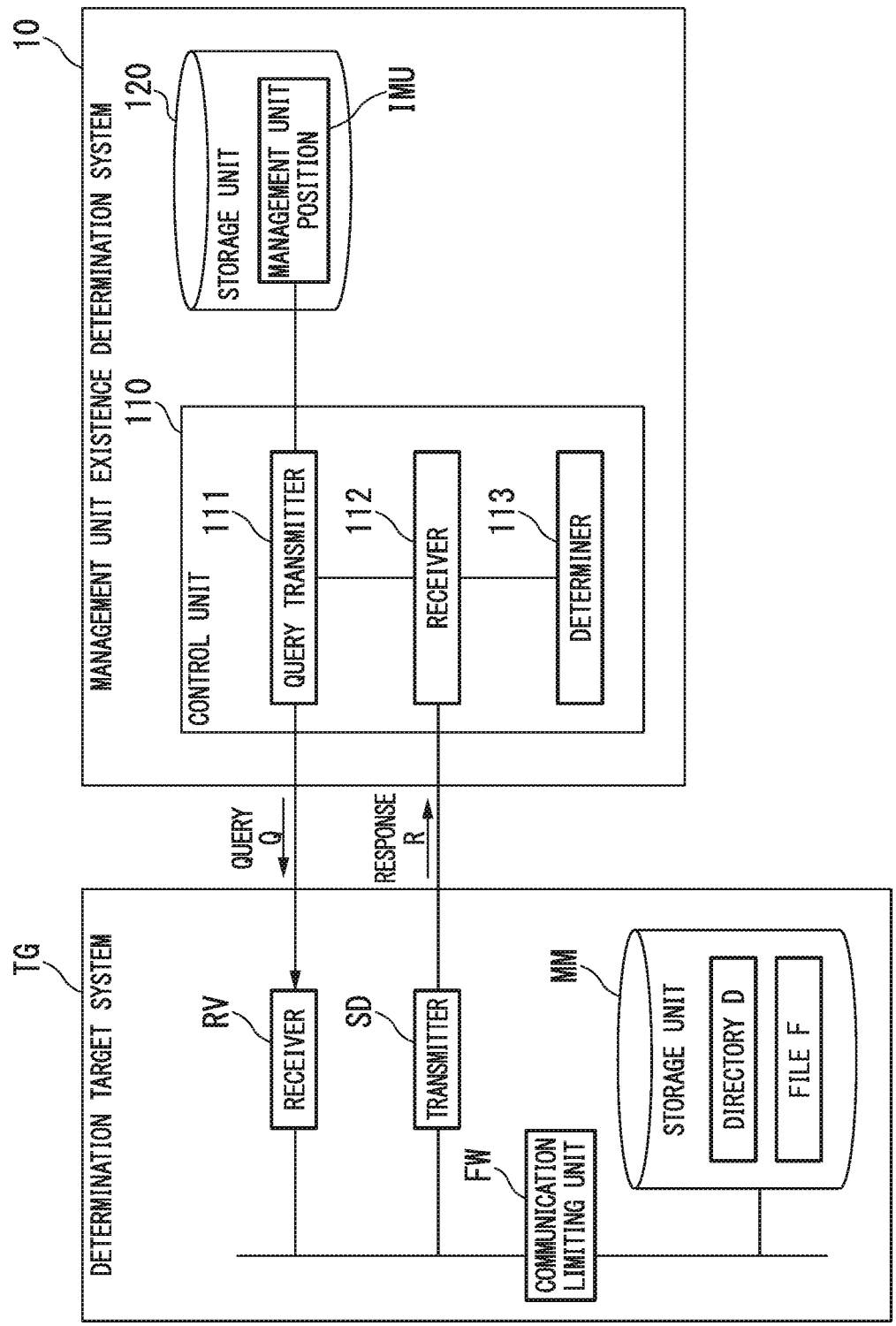
FIG. 2 is an overview figure representing an example of a configuration of the management unit existence determination system according to the present embodiment.

Hereinafter, a configuration of the management unit existence determination system 10 will be described with reference to FIG. 2. FIG. 2 is an overview figure representing an example of the configuration of the management unit existence determination system 10.

First, the determination target apparatus TG will be described. The determination target apparatus TG includes a receiver RV, a transmitter SD, a communication limiting unit FW, a storage unit MM. A directory D and the file F are stored in the storage unit MM. The directory D and the file F stored in the storage unit MM are managed by a file system FS using a hierarchical structure.

Figure 3:
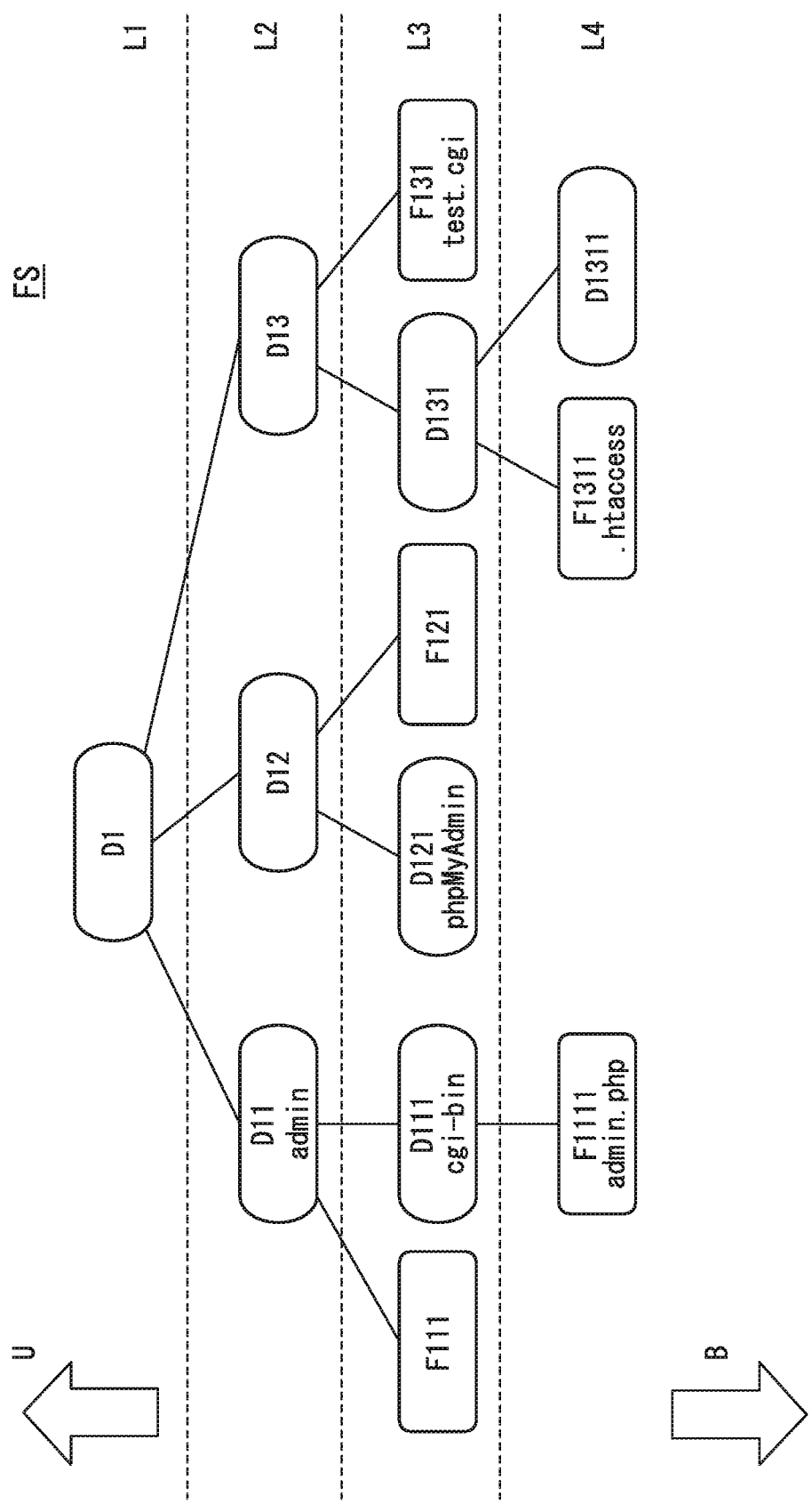
FIG. 3 is a schematic diagram representing an example of a configuration of a file system according to the present embodiment.

Hereinafter, an example of the file system FS will be described with reference to FIG. 3. FIG. 3 is a schematic diagram showing an example of a configuration of the file system FS according to the present embodiment.

The file system FS manages the file F using a hierarchical structure. Specifically, the file system FS manages the file F and the directory D using a hierarchical structure. The directory D is a unit for managing the file F.

In this example, a case in which the file system FS has a hierarchical structure shown in FIG. 3 will be described. As shown in FIG. 3, in the case of this example, a layer L1, which is the top layer, of the file system FS, which has the hierarchical structure, corresponds to a directory D1. A directory D11, a directory D12, and a directory D13 are stored in the directory D1. That is, the directory D11, the directory D12, and the directory D13 correspond to a layer L2 which is a layer that is one layer below the layer L1 in a "B" direction. A directory D111 and a file F111 are stored in the directory D11. Further, a directory D121 and a file F121 are stored in the directory D12. In addition, a directory D131 and a file F131 are stored in the directory D13. That is, the directory D111, the file F111, the directory D121, the file F121, the directory D131, and the file F131 correspond to a layer L3 of a layer that is one layer below the layer L2 in the "B" direction. A file F1111 is stored in the directory D111. In addition, a directory D1311 and a file F1311 are stored in the directory D131. That is, the file F1111, the directory D1311, and the file F1311 correspond to a layer L4 which is a layer that is one layer below the layer L3 in the "B" direction. In other words, a layer that is one layer above the layer L4 in a "U" direction corresponds to the layer L3. Further, a layer that is one layer above the layer L3 in the "U" direction corresponds to the layer 12. In addition, a layer that is one layer above the layer L2 in the "U" direction corresponds to the layer L1.

Here, the directory D and the file F are generally referred to as a management unit MU.

Next, returning to FIG. 2, the receiver RV will be described. The receiver RV receives the query Q for asking whether the management unit MU stored in the storage unit MM can be referred to or not by the other apparatuses OTH or the management unit existence determination system 10. The query Q includes management unit position information IMA indicating a place of the management unit MU to be referred to. The management unit position information IMA represents information indicating a position at which the management unit MU is stored by listing names of one or a plurality of management units MU. Further, a name of the management unit MU is represented by one or a plurality of characters. The characters are alphanumeric characters, symbols, special characters, or the like.

Specifically, the management unit position information IMA represents, for example, paths. Hereinafter, an example of the management unit position information IMA will be described with reference to FIG. 3.

In a case in which the query Q is a query for asking whether the file F121 shown in FIG. 3 can be referred to or not, the query Q includes the management unit position information IMA indicating a place of the file F121. In this example, a case in which the management unit position information IMA is distinguished by "/" for each management unit MU with respect to the layer that is one layer above a current layer in the "U" direction will be described. Specifically, as shown in FIG. 3, the file F121 is stored in the directory D12 included in the directory D1. In this example, the management unit position information IMA of the file F121 is represented by a name of the directory D1/a name of the directory D12/a name of the file F121.

Next, returning to FIG. 2, the communication limiting unit FW will be described. The communication limiting unit FW acquires the query Q received by the receiver RV. The communication limiting unit FW limits communication of the determination target apparatus TG according to details of the query Q received by the receiver RV. Specifically, security information SI is set in advance in the communication limiting unit FW. The security information SI represents information indicating whether the management unit MU can be referred to or not. Specifically, the referencing of the management unit MU included in the security information SI is limited. In other words, the communication limiting unit FW limits the reference of the management unit MU included in the query Q in a case in which the management unit MU included in the query Q is included in the security information SI.

A case in which whether the management unit MU can be referred to or not is set by the security information SI is described above, but the invention is not limited thereto. The setting of whether the management unit MU can be referred to or not may be performed in the management unit MU. Specifically, a function for authenticating a user who can refer to the management unit MU may be set in the management unit MU.

The transmitter SD transmits the response R to the other apparatuses OTH or the management unit existence determination system 10 on the basis of the limit of the communication limiting unit FW. Details of the response R are different according to a state of the management unit MU and the limit of the communication limiting unit FW. The state of the management unit MU represents, for example, a state in which the management unit MU indicated by the management unit position information IMA included in the query Q does not exist at a place indicated by the management unit position information IMA or is moved from the place. In this example, a case in which the response R includes a permission response PR, a movement response MR, a certification response CP, a rejection response RR, and a non-existence response NER will be described.

The permission response PR represents the response R in a case in which the reference of the management unit MU indicated by the management unit position information IMA included in the query Q is not limited by the communication limiting unit FW. Further, the movement response MR represents the response R in a case in which the management unit MU indicated by the management unit position information IMA included in the query Q is moved from a place indicated by the management unit position information IMA. In addition, the certification response CR represents a response in a case in which the management unit MU indicated by the management unit position information IMA included in the query Q is limited by the communication limiting unit FW with respect to a user who can refer to the management unit MU. Furthermore, the certification response CR represents the response R in a case in which the user who can refer to the management unit MU indicated by the management unit position information IMA included in the query Q is set in the management unit MU.

Further, the rejection response RR represents the response R in a case in which the reference of the management unit MU indicated by the management unit position information IMA included in the query Q is limited by the communication limiting unit FW. In addition, the non-existence response NER represents the response R in the following two cases. First, one case is a case in which the non-existence response NER represents the response R in a case in which the management unit MU indicated by the management unit position information IMA included in the query Q does not exist at a place indicated by the management unit position information IMA. The other case is a case in which the non-existence response NER represents the response R in a case in which the reference of the management unit MU indicated by the management unit position information IMA included in the query Q is limited by the communication limiting unit FW.

Next, the management unit existence determination system 10 will be described. The management unit existence determination system 10 includes a control unit 110 and a storage unit 120.

The storage unit 120 stores management unit information IMU in advance. The management unit information IMU represents information for confirming the existence of the determination target apparatus TG, in which the file F and the directory D of a determination target are defined.

Hereinafter, an example of the management unit information IMU will be described with reference to FIG. 4. FIG. 4 is a table representing an example of the management unit information IMU according to the present embodiment. In this example, as shown in FIG. 4, the storage unit 120 stores a plurality of pieces of management unit position information IMA which is the management unit information IMU. In this example, a case in which five pieces of management unit position information IMA, which is the management unit information IMU, are stored in the storage unit 120 will be described. Further, the management unit position information IMA, which is the management unit information IMU, is assigned an identification number NO for each piece of management unit position information IMA. In the case of this example, management unit position information IMA1 is associated with an identification number NO1. Further, management unit position information IMA2 is associated with an identification number NO2. Management unit position information IMA3 is associated with an identification number NO3. Management unit position information IMA4 is associated with an identification number NO4. Furthermore, management unit position information IMA5 is associated with an identification number NO5.

In the case of this example, a case in which the management unit position information IMA1 represents the directory D121 (phpMyAdmin) will be described.

Further, in the case of this example, a case in which the management unit position information IMA2 represents the file F131 (test.cgi) will be described. In addition, in the case of this example, a case in which the management unit position information IMA3 represents the file 1311 (.htaccess) will be described. In the case of this example, a case in which the management unit position information IMA4 represents the directory D11/directory D111/file F1111 (admin/cgi-bin/admin.php) will be described. Furthermore, in the case of this example, a case in which the management unit position information IMA5 represents the directory D11 (admin) will be described.

Next, returning to FIG. 2, the control unit 110 will be described. The control unit 110 includes a query transmitter 111, a receiver 112, and a determiner 113 as functional units.

The query transmitter 111 reads the management unit information IMU from the storage unit 120. The query transmitter 111 transmits the query Q for confirming whether the management unit MU indicated by the management unit position information IMA, which is the management unit information IMU, can be referred to or not to the determination target apparatus TG.

Specifically, the query transmitter 111 transmits a first query Q1 on the basis of the management unit position information IMA which is the management unit information IMU. Further, the query transmitter 111 transmits a second query Q2 and a third query Q3 to the determination target apparatus TG, in response to the response R from the determination target apparatus TG with respect to the first query Q1 determined by the determiner 113. The response R from the determination target apparatus TG with respect to the first query Q1 determined by the determiner 113 will be described later.

Hereinafter, the first query Q1, the second query Q2, and the third query Q3 in a case in which the query transmitter 111 transmits the query Q with respect to management unit position information IMA1, which is the management unit information IMU, will be described.

[First Query Q1]

First the first query Q1 will be described. The query transmitter 111 reads the management unit information IMU from the storage unit 120. The query transmitter 111 transmits the first query Q1 to the determination target apparatus TG to confirm whether the management unit MU indicated by the management unit position information IMA stored as the management unit information IMU can be referred to or not. The first query Q1 represents the query Q for confirming whether the management unit MU indicated by the management unit position information IMA can be referred to or not without changing the management unit position information IMA.

For example, the query transmitter 111 reads the directory D121 (phpMyAdmin) which is the management unit position information IMA1 stored as the management unit information IMU. The query transmitter 111 transmits the first query Q1 to the determination target apparatus TG to confirm whether the directory D121 (phpMyAdmin) can be referred to or not.

[Second Query Q2]

Next, the second query Q2 will be described. The query transmitter 111 reads the management unit information IMU from the storage unit 120. The query transmitter 111 transmits the second query Q2 to the determination target apparatus TG to confirm whether the management unit MU indicated by the management unit position information IMA stored as the management unit information IMU can be referred to or not. The second query Q2 represents the query Q for confirming whether the management unit MU indicated by the management unit position information IMA can be referred to or not, in which a part of the management unit position information IMA is changed. The part of the management unit position information IMA is the first character in the name of the management unit MU indicated by the management unit position information IMA stored as the management unit information IMU.

For example, the query transmitter 111 reads the directory D121 (phpMyAdmin) which is the management unit position information IMA1 stored as the management unit information IMU. The query transmitter 111 transmits the second query Q2 in which a part of the directory D121 (phpMyAdmin) is changed to the determination target apparatus TG. Here, a case in which the second query Q2 represents the query Q in which the directory D121 (phpMyAdmin) is changed to a directory D121C2 (XhpMyAdmin) will be described. The query transmitter 111 transmits the second query Q2 to the determination target apparatus TG to confirm whether the directory D121C2 (XhpMyAdmin) can be referred to or not.

[Third Query Q3]

Next, the third query Q3 will be described. The query transmitter 111 reads the management unit information IMU from the storage unit 120. The query transmitter 111 transmits the third query Q3 to the determination target apparatus TG to confirm whether the management unit MU indicated by the management unit position information IMA stored as the management unit information IMU can be referred to or not. The third query Q3 represents the query Q in which a part of the management unit position information IMA is changed. The part of the management unit position information IMA is a portion that is different from the portion changed in the second query Q2. The third query Q3 represents the query Q for confirming whether the management unit MU indicated by the management unit position information IMA can be referred to or not, in which the part of the management unit position information IMA is changed. The part of the management unit position information IMA is the last character in the name of the management unit MU indicated by the management unit position information IMA stored as the management unit information IMU.

For example, the query transmitter 111 reads the directory D121 (phpMyAdmin) which is the management unit position information IMA1 stored as the management unit information IMU. The query transmitter 11 transmits the third query Q3 in which a part of the directory D121 (phpMyAdmin) is changed to the determination target apparatus TG. Further, the part of the directory D121 (phpMyAdmin) is a portion different from the portion changed in the query Q2. Here, a case in which the third query Q3 represents the query Q in which the directory D121 (phpMyAdmin) is changed to a directory D121C3 (phpMyAdmiX) will be described. The query transmitter 111 transmits the third query Q3 to the determination target apparatus TG to confirm whether the directory D121C3 (phpMyAdmiX) can be referred to or not.

A case in which the portion changed in the second query Q2 and the third query Q3 is the first and last characters in the name of the management unit MU indicated by the management unit position information IMA which is the management unit MU is described above, but the invention is not limited thereto. In a case in which the first or last character in the name of the management unit MU indicated by the management unit position information IMA is a special character, a character contiguous to the first or last character may be changed. A special character represents a symbol such as "." (dot) or "_" (underscore).

For example, in a case in which the query transmitter 111 transmits the second query Q2 in the file F1311 (.htaccess) indicated by management unit position information IMA3, the second query Q2 represents the query Q in which the file F1311 (.htaccess) is changed to a file 1311 C2 (.Xtaccess).

A case in which the first or last character in the name of the management unit MU indicated by the management unit position information IMA in the second query Q2 and the third query Q3 is changed to X is described above, but the invention is not limited thereto. The first or last character in the name of the management unit MU indicated by the management unit position information IMA in the second query Q2 and the third query Q3 may be any character other than a special character. Further, the first or last character in the name of the management unit MU indicated by the management unit position information IMA in the second query Q2 and the third query Q3 may be any character that is not the same as a pre-change character.

The receiver 112 receives the response R transmitted by the determination target apparatus TG with respect to the query Q transmitted by the query transmitter 111. Specifically, the receiver 112 receives a first response R1 to the first query Q1 transmitted by the query transmitter 111. Further, the receiver 112 receives a second response R2 to the second query Q2 transmitted by the query transmitter 111. In addition, the receiver 112 receives a third response R3 to the third query Q3 transmitted by the query transmitter 111. The response R received by the receiver 112 is any one of the permission response PR, the movement response MR, the certification response CR, the rejection response RR, and the non-existence response NER transmitted by the determination target apparatus TG.

The determiner 113 acquires the response R received by the receiver 112. The determiner 113 determines whether there is a possibility that the file F or the directory D exists in the determination target apparatus TG on the basis of the acquired response R.

Hereinafter, the determination of the determiner 113 will be described with reference to FIG. 5. FIG. 5 is a table representing an example of the determination of the determiner 113 according to the present embodiment.

The determiner 113 determines whether the management unit MU indicated by the management unit position information IMA, which is the management unit information IMU included in the query Q, can be referred to or not on the basis of the response R received by the receiver 112.

Hereinafter, a case in which the management unit existence determination system 10 asks the first query Q1 in which the management unit information IMU stored in the storage unit 120 is included as the management unit information IMU will be described with reference to FIG. 5.

[Determination Made by Determiner 113]

In a case in which the receiver 112 receives the permission response PR to the first query Q1, the management unit MU indicated by the management unit position information IMA, which is the management unit information IMU included in the first query Q1, exists in the determination target apparatus TG. Further, the management unit MU indicated by the management unit position information IMA, which is the management unit information IMU, is in a state that is capable of being referred to in the determination target apparatus TG. That is, it can be said that the management unit MU indicated by the management unit position information IMA exists in the determination target apparatus TG.

Then, in a case in which the receiver 112 receives the movement response MR to the first query Q1, the management unit MU indicated by the management unit position information IMA, which is the management unit information IMU included in the first query Q1, does not exist in the determination target apparatus TG. That is, the management unit MU indicated by the management unit position information IMA, which is the management unit information IMU included in the first query Q1, is in a state that is incapable of being referred to. That is, it can be said that the management unit MU indicated by the management unit position information IMA does not exist in the determination target apparatus TG.

Then, in a case in which the receiver 112 receives the certification response CR to the first query Q1, the management unit MU indicated by the management unit position information IMA, which is the management unit information IMU included in the first query Q1, is in the state that is incapable of being referred to. Here, there is a possibility that the management unit MU indicated by the management unit position information IMA, which is the management unit information IMU included in the first query Q.1 exists in the determination target apparatus TG. That is, there can be said to be a possibility that the management unit MU indicated by the management unit position information IMA exists in the determination target apparatus TG.

Next, in a case in which the receiver 112 receives the permission response PR to the first query Q1, the management unit MU indicated by the management unit position information IMA, which is the management unit information IMU included in the first query Q1, is in the state that is capable of being referred to. Here, there is a possibility that the management unit MU indicated by the management unit position information IMA, which is the management unit information IMU included in the first query Q1, exists in the determination target apparatus TG. That is, there can be said to be a possibility that the management unit MU indicated by the management unit position information IMA exists in the determination target apparatus TG.

Then, in a case where the receiver 112 receives the non-existence response NER to the first query Q1, the management unit MU indicated by the management unit position information IMA stored as the management unit information IMU does not exist in the determination target apparatus TG, and is in the state that is incapable of being referred to. That is, it can be said that the management unit MU indicated by the management unit position information IMA does not exist in the determination target apparatus TG.

As described above, in a case in which the receiver 112 receives the authentication response CR and the rejection response RR, it can be said that the management unit MU indicated by the management unit position information IMA exists in the determination target apparatus TG. Here, in a case in which the authentication response CR and the rejection response RR are received, the management unit MU indicated by the management unit position information IMA stored as the management unit information IMU is in the state that is incapable of being referred to. That is, in this case, it cannot be said that there is a possibility that the management unit MU exists since the existence of the management unit MU cannot be confirmed.

On the other hand, the determiner 113 instructs the query transmitter 111 to transmit the second query Q2 and the third query Q3. That is, the query transmitter 111 transmits the second query Q2 and the third query Q3 to the determination target apparatus TG in response to the first response R1.

The determiner 113 determines whether the management unit MU, in which the first response R1 is the certification response CR and the rejection response RR, exists on the basis of the second response R2 and the third response R3 acquired from the receiver 112.

The determiner 113 more specifically determines whether the management unit MU indicated by the management unit position information IMA, which is the management unit information IMU included in the query Q, exists on the basis of responses R to the first query Q1, the second query Q2, and the third query Q3 received by the receiver 112.

Hereinafter, a case in which the query transmitter 111 transmits the first query Q1, the second query Q2, and the third query Q3 for confirming whether the management unit MU indicated by the management unit position information IMA, which is the management unit information IMU, exists will be described. Further, a case in which the receiver 112 acquires the first response R1, the second response R2, and the third response R3 will be described.

[Details of Determination Made by Determiner 113]

In a case in which the first response R1 is the non-existence response NER, the determiner 113 determines that the management unit MU indicated by the management unit position information IMA does not exist in the determination target apparatus TG.

Further, in a case in which the first response R1 is not the non-existence response NER, the determiner 113 determines that the management unit MU indicated by the management unit position information IMA does not exist in the determination target apparatus TG under the following two conditions. One condition corresponds to a case in which the first response R1 and the second response R2 match each other and the first response R1 and the third response R3 do not match each other. The other condition corresponds to a case in which the first response R1 and the third response R3 match each other and the first response R1 and the second response R2 do not match each other.

In the case of either of the above-described two conditions, the determiner 113 determines that the management unit MU indicated by the management unit position information IMA does not exist in the determination target apparatus TG.

That is, in a case in which the first response R1 is not the non-existence response NER and in a case in which the first response R1 does not match the second response R2 and the third response R3, the determiner 113 determines that the management unit MU indicated by the management unit position information IMA exists in the determination target apparatus TG.

A case in which the response R received by the receiver 112 is any one of the permission response PR, the movement response MR, the certification response CR, the rejection response RR, and the non-existence response NER is described above, but the invention is not limited thereto. The receiver 112 may receive, for example, a server failure response BKR which is the response R in a case in which a certain error occurs in the determination target apparatus TG in addition to the above-described five responses R.

Hereinafter, an operation of the management unit existence determination system 10 will be described with reference to FIG. 6. FIG. 6 is a flowchart representing an example of an operation of the management unit existence determination system 10 according to the present embodiment.

The query transmitter 111 transmits the first query Q1 to the determination target apparatus TG (step S100). The determination target apparatus TG receives the first query Q1 from the management unit existence determination system 10 (step S110). The determination target apparatus TG transmits the first response R1 to the first query Q1 to the determination target apparatus TG (step S120). The receiver 112 receives the first response R1 from the determination target apparatus TG (step S130). The receiver 112 supplies the received first response R1 to the determiner 113 (step S140). The determiner 113 determines whether the first response R1 acquired from the receiver 112 is the non-existence response NER (step S150). In a case in which it is determined that the first response R1 is the non-existence response NER (step S150; YES), the determiner 113 determines that the management unit MU indicated by the management unit position information IMA, which is included as the management unit information IMU, does not exist in the first query Q1 (step S160). In a case in which it is determined that the first response R1 is not the non-existence response NER (step S150; NO), the determiner 113 instructs the query transmitter 111 to transmit the second query Q2 and the third query Q3 (step S170).

The query transmitter 111 transmits the second query Q2 to the determination target apparatus TG on the basis of the instruction of the determiner 113 (step S180). The determination target apparatus TG receives the second query Q2 from the management unit existence determination system 10 (step S190). The determination target apparatus TG transmits the second response R2 to the second query Q2 to the management unit existence determination system 10 (step S200). The receiver 112 receives the second response R2 from the determination target apparatus TG (step S210). The receiver 112 supplies the received second response R2 to the determiner 113 (step S220). The query transmitter 111 transmits the third query Q3 to the determination target apparatus TG on the basis of the instruction of the determiner 113 (step S230). The determination target apparatus TG receives the third query Q3 from the management unit existence determination system 10 (step S240). The determination target apparatus TG transmits the third response R3 to the third query Q3 to the management unit existence determination system 10 (step S250). The receiver 112 receives the third response R3 from the determination target apparatus TG (step S260). The receiver 112 supplies the received third response R3 to the determiner 113 (step S270).

The determiner 113 determines whether the first response R1 acquired from the receiver 112 and the second query Q2 match each other (step S280). In a case in which it is determined that the first response R1 acquired from the receiver 112 and the second query Q2 do not match each other (step S280; NO), the determiner 113 causes the procedure to proceed to step S290. Further, in a case in which it is determined that the first response R1 acquired from the receiver 112 and the second query Q2 match each other (step S280; YES), the determiner 113 determines that the management unit MU indicated by the management unit position information IMA, which is included as the management unit information IMU, does not exist in the first query Q1 (step S160). The determiner 113 determines whether the first response R1 acquired from the receiver 112 and the third query Q3 match each other (step S290). In a case in which it is determined that the first response R1 acquired from the receiver 112 and the third query Q3 do not match each other (step S290; NO), the determiner 113 causes the procedure to proceed to step S300. Further, in a case in which it is determined that the first response R1 acquired from the receiver 112 and the third query Q3 match each other (step S290; YES), the determiner 113 determines that the management unit MU indicated by the management unit position information IMA, which is included as the management unit information IMU, does not exist in the first query Q1 (step S160). In addition, the determiner 113 determines that the management unit MU indicated by the management unit position information IMA, which is included as the management unit information IMU, exists in the first query Q1 (step S300).

As described above, the management unit existence determiner 10 includes the query transmitter 111, the receiver 112, and the determiner 113. The query transmitter 111 transmits the query Q for confirming the existence of the management unit MU managed by the file system FS using a hierarchical structure in the storage unit MM of the determination target apparatus TG to the determination target apparatus TG. The query Q includes the management unit information IMU. Specifically, the query Q aims to confirm the existence of the management unit MU indicated by the management unit information IMA which is the management unit information IMU. More specifically, the query Q includes the first query Q1 as well as the second query and the third query Q3 including information in which a part of the management unit information IMU included in the first query Q1 is changed. The query transmitter 111 transmits the first query Q1, the second query Q2, and the third query Q3 to the determination target apparatus TG. The receiver 112 receives the first response R1, the second response R2, and the third response R3 from the determination target apparatus TG. The determiner 113 performs comparison of the first response R1, the second response R2, and the third response R3, which are received by the receiver 112, to determine whether the management unit MU indicated by the management unit position information IMA, which is the management unit information IMU, exists in the determination target apparatus TG.

In the related art, in a case in which the determination target apparatus TG transmits the certification response CR and the rejection response RR to the first query Q1 transmitted from the management unit existence determination system 10, there is a case in which it can be said that there is no possibility that the management unit MU exists reliably in the determination target apparatus TG. Specifically, in a case in which the determination target apparatus TG transmits the certification response CR and the rejection response RR to the first query Q1 of the management unit existence determiner 10, there is a case in which it cannot be guaranteed that the management unit MU indicated by the management unit position information IMA, which is the management unit information IMU included in the first query Q1, exists.

On the other hand, the determiner 113 according to this embodiment can enhance the accuracy for determining whether the management unit MU, in which the first response R1 is the certification response CR and the rejection response RR, exists on the basis of the second response R2 and the third response R3 acquired from the receiver 112. That is, it is possible to reduce an erroneous determination when determining whether the management unit existence determiner 10 determines whether the management unit MU indicated by the management unit position information IMA, which is the management unit information IMU included in the first query Q1, exists in the determination target apparatus TG.

Descriptions will be made in a case where the management unit information IMU represents a file with vulnerability. According to the management unit existence determiner 10 of this embodiment, it is possible to reduce an erroneous determination when determining whether a file with vulnerability indicated by the management unit position information IMA exists in the determination target apparatus TG. That is, according to the management unit existence determiner 10 of this embodiment, it is possible to reduce an erroneous determination when determining whether vulnerability exists in the determination target apparatus TG.

Further, the management unit information IMU includes names of one or a plurality of management units MU. Further, the name of the management unit MU includes one or a plurality of alphanumeric characters. The second response R2 is a query in which the first alphanumeric character among alphanumeric characters included in a name of the certain management unit MU is changed. Further, the third response R3 is a query in which the last alphanumeric character among alphanumeric characters included in the name of the certain management unit MU is changed.

Here, there is a case in which the determination target apparatus TG transmits uniform responses R to the first query Q1 transmitted from the management unit existence determination system 10 due to the influence of a specific character string included in the query Q. Specifically, for example, in a case in which a specific character string ".ht" is included in a leading portion of the name of the management unit MU indicated by the management unit position information IMA which is the management unit information IMU, there is a case in which the determination target apparatus TG returns the rejection response RR. More specifically, for example, even in a case in which the management unit MU in which the specific character string ".ht" is included in the name thereof does not exist in the determination target apparatus TG, there is a case in which the determination target apparatus TG returns the rejection response RR.

In addition, similarly, in a case in which a specific character string ".cgi" is included in a last portion of the name of the management unit MU indicated by the management unit position information IMA which is the management unit information IMU, there is a case in which the determination target apparatus TG returns the rejection response RR. More specifically, for example, even in a case in which the management unit MU in which the specific character string ".cgi" is included in the name thereof does not exist in the determination target apparatus TG, there is a case in which the determination target apparatus TG returns the rejection response RR.

In this case, since the determination target apparatus TG returns the rejection response RR, even in a case in which the management unit MU indicated by the management unit position information IMA, which is the management unit information IMU, does not exist, it is determined that the management unit MU exists in the related art. That is, there is a case in which an erroneous determination indicating that the management unit position information IMA, which is the management unit information IMU included in the query Q, exists in the determination target apparatus TG is made in the related art.

On the other hand, the determiner 113 of this embodiment performs comparison and determination of the second response R2 to the second query Q2 for which the first alphanumeric character among alphanumeric characters included in the name of the certain management unit MU is changed and the first response R1. Further, the determiner 113 performs comparison and determination of the third response R3 to the third query Q3 for which the last alphanumeric character among alphanumeric characters included in the name of the certain management unit MU is changed and the first response R1.

Thus, even in a case in which a specific character string is included in the query Q, the determiner 113 can enhance the accuracy for determining whether the management unit MU exists in the determination target apparatus TG. That is, in the management unit existence determination system 10, when determining whether a file management unit MU indicated by the management unit position information IMA, which is the management unit information IMU included in the first query Q1, exists in the determination target apparatus TG, it is possible to reduce an erroneous determination.

Further, in a case in which the first alphanumeric character in the name of the management unit MU of the management unit information IMU indicated by the management unit MU or the last alphanumeric character in the name of the management unit MU is a special character, the second query Q2 and the third query Q3 are queries in which an alphanumeric character contiguous to the first or last character in the name of the management units MU is changed. That is, in a case in which the first or last character in the name of the management unit MU indicated by the management unit position information IMA is a special character, a character contiguous to the first or last character may be changed. The special character represents a symbol such as "." (dot) or "_" (underscore).

For example, in a case in which the query transmitter 111 transmits the second query Q2 in the directory D121 (.htaccess) indicated by the management unit position information IMA3, the second query Q2 is (.Xtaccess).

Thus, even in a case in which a special character is included in the query Q, the determiner 113 can enhance the accuracy for determining whether the management unit MU exists in the determination target apparatus TG. That is, in the management unit existence determination system 10 of this embodiment, it is possible to reduce an erroneous determination when determining whether the management unit MU indicated by the management unit position information IMA, which is the management unit information IMU included in the first query Q1, exists in the determination target apparatus TG.

Modified Example

Figure 7:
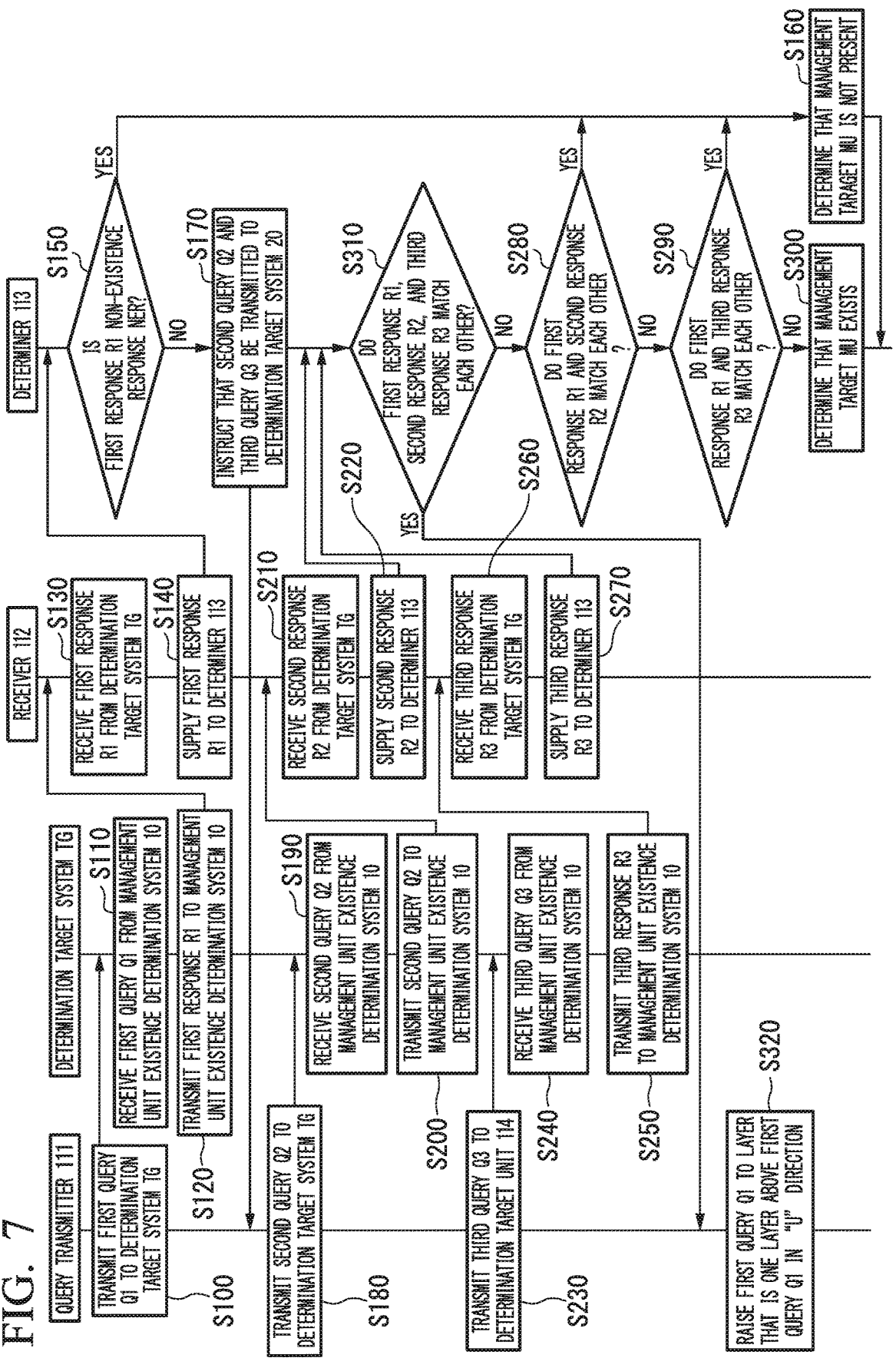
FIG. 7 is a flowchart representing an example of an operation of a management unit existence determination system of a modified example according to the present embodiment.

Next, a modified example of the first embodiment will be described. FIG. 7 is a flowchart representing an example of an operation of a management unit existence determination system 10 of the modified example according to the present embodiment. Hereinafter, the modified example according to the present embodiment will be described with reference to FIG. 7. In the following description, the same reference numerals are given to the same configuration or same operations as in the first embodiment, and descriptions thereof will not be repeated.

As shown in FIG. 7, the determiner 113 determines whether the first response R1, the second response R2, and the third response R3 match each other (step S310). In a case in which the determiner 113 determines that the first response R1, the second response R2, and the third response R3 match each other (step S310; YES), the determiner 113 instructs the query transmitter 111 to transmit the first query Q1 which is the query Q on a layer that is one layer above the query Q1 in the "U" direction to the determination target apparatus TG. The query transmitter 111 raises the first query Q1 to the layer that is one layer above the first query Q1 in the "U" direction on the basis of the instruction from the determiner 113 (step S320). Thereafter, the processes from step S100 to step S320 are repeated.

Here, a case in which the directory D11/directory D111/file F11 (admin/cgi-bin/admin.php) is included in the first query Q1 as the management unit MU indicated by the management unit position information IMA4, which is the management unit information IMU, will be described. In the case of this example, the directory D11/directory D111/file F111 (admin/cgi-bin/admin.php) is included in the first query Q1 as the management unit MU indicated by the management unit position information IMA4. Further, the directory D11/directory D111/file F111C2 (admin/cgi-bin/Xdmin.php) in which a part of the file F111 of the management unit MU indicated by the management unit position information IMA4 is changed is included in the second query Q2. Furthermore, the directory D1/directory D111/file F111C3 (admin/cgi-bin/admin.phX) in which a part of the file F111 of the management unit MU indicated by the management unit position information IMA4 is changed is included in the third query Q3.

In an example thereof, the determiner 113 determines whether the first response R1, the second response R2, and the third response R3 match each other (step S310). In this example, in a case in which it is determined that the first response R1, the second response R2, and the third response R3 match each other (step S310; YES), the determiner 113 instructs the query transmitter 111 to make the query Q which is the layer that is one layer above the first query Q1 in the "U" direction. In this case, the directory D11/directory D111 (admin/cgi-bin) which is a layer that is one layer above the management unit MU indicated by the management unit position information IMA4 in the "U" direction is included in the query Q which is the layer that is one layer above the first query Q1 in the "U" direction. That is, the query transmitter 111 sets the query Q including the directory D11/directory D111 (admin/cgi-bin), which is the layer that is one layer above the management unit MU indicated by the management unit position information IMA4 in the "U" direction, as the query Q1 (step S320). Thereafter, the processes from step S100 to step S320 are repeated.

As described above, the management units MU are respectively included in a plurality of layers L in the file system FS. On the basis of a determination result of the determiner 113 with respect to a management unit MU included in a certain layer L among the layers L, the query transmitter 111 transmits the first query Q1, the second query Q2, and the third query Q3 with respect to the management unit MU included in a layer L other than the certain layer L to the determination target apparatus TG. Thus, in a case in which the determiner 113 determines that the management unit MU indicated by the management unit position information IMA, which is the management unit information IMU included in the query Q, does not exist in the determination target apparatus TG, it is possible to extract which one of the management units MU included in the plurality of layers L causes the determiner 113 to perform the non-existence determination.

Thus, the determiner 113 extracts which one of the management units MU included in the plurality of layers L caused the non-existence in the determination target apparatus TG. That is, according to the management unit existence determination system 10 of the present embodiment, it is possible to reduce efforts for determining whether the management unit MU indicated by the management unit position information IMA, which is the management unit information IMU included in the first query Q1, exists in the determination target apparatus TG.

The apparatus, systems and methods in the above-described embodiments may be deployed in part or in whole through machines, a system of circuits, circuitry, hardware processors that executes computer software, software components, program codes, and/or instructions on one or more machines, a system of circuits, circuitry, hardware processors. In some cases, the one or more machines, a system of circuits, circuitry, hardware processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more hardware processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more hardware processors may enable execution of multiple programs, threads, and codes. The threads may be executed simultaneously to enhance the performance of the one or more hardware processors and to facilitate simultaneous operations of the application. Program codes, program instructions and the like described herein may be implemented in one or more threads. The one or more hardware processors may include memory that stores codes, instructions and programs as described herein. The machines, a system of circuits, circuitry, hardware processors may access a non-transitory processor-readable storage medium through an interface that may store codes, instructions and programs as described herein and elsewhere. The non-transitory processor-readable storage medium associated with the machines, a system of circuits, circuitry, hardware processors for storing programs, codes, program instructions or other type of instructions capable of being executed by the computing or processing device may include but may not be limited to one or more of a memory, hard disk, flash drive, RAM, ROM, CD-ROM. DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods, apparatus and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods, apparatus and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM. GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer. RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example. USB sticks or keys, floppy disks, magnetic tape, paper tape, punch cards, standalone RAM disks. Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

As used herein, the following directional terms "front, back, above, downward, right, left, vertical, horizontal, below, transverse, row and column" as well as any other similar directional terms refer to those instructions of a device equipped with embodiments of the present invention. Accordingly, these terms, as utilized to describe embodiments of the present invention should be interpreted relative to a device equipped with embodiments of the present invention.

Each element for the system, device and apparatus described above can be implemented by hardware with or without software. In some cases, the system, device and apparatus may be implemented by one or more hardware processors and one or more software components wherein the one or more software components are to be executed by the one or more hardware processors to implement each element for the system, device and apparatus. In some other cases, the system, device and apparatus may be implemented by a system of circuits or circuitry configured to perform each operation of each element for the system, device and apparatus.

While the present disclosure includes many embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A management unit existence determination system comprising:
   one or more memories that store one or more software components comprising processor executable instructions;
   one or more hardware processors configured to execute the processor executable instructions to cause the one or more hardware processors to:
   transmit a first query and a second query set to a determination target apparatus, wherein the first query includes a management unit information which indicates a management unit of a file management system, the file management system being configured to respond to the first query and the second query set in response to at least a part of a name of the management unit, the first query is to confirm the existence of the management unit of the file management system;
   receive a response to the first query and a response to the second query set from the determination target apparatus; and
   compare the response to the first query with the response to the second query set; and
   determine the existence of the management unit based on a result of the comparison,
   wherein the second query set comprises a first comparative query and a second comparative query,
   wherein if the name of the management unit, which position is indicated by a management unit position information of the management unit information, has a series of characters and does not include a special character dot "." at a first character position and includes the special character dot "." at a second or subsequent character position, then the first comparative query has an alphanumerically-changed character which is positioned before the special character dot ".", and the second comparative query has an alphanumerically-changed character which is positioned after the special character dot ".",
   wherein if the name of the management unit includes the special character dot "." at the first character position, then the first comparative query has an alphanumerically-changed character which is positioned at a second or subsequent character position, and the second comparative query has an alphanumerically-changed character which is positioned closest to a last character position,
   wherein if the name of the management unit does not include the special character dot "." at any positions, then the first comparative query has an alphanumerically-changed character which is positioned at a first alphanumerical character position, and the second comparative query has an alphanumerically-changed character which is positioned at a last alphanumerical character position,
   wherein comparing the response to the first query with the response to the second query set comprises performing a first comparison and a second comparison, the first comparison is to compare the first query with the first comparative query to determine whether the first query is identical in its feature with the first comparative query, and the second comparison is to compare the first query with the second comparative query to determine whether the first query is identical in its feature with the second comparative query,
   wherein determining the existence of the management unit comprises determining that the management unit exists if the first query is not identical in its feature with the first comparative query and the first query is not identical in its feature with the second comparative query, and
   wherein the alphanumerically-changed character is an alphanumerical character which is changed from an alphanumerical character.

2. The management unit existence determination system according to claim 1, wherein the second query set comprises:
   a query including a first partially changed management unit information which has been changed in a first part of the name of the management unit from the management unit information; and
   a query including: a second partially changed management unit information which has been changed in a second part of the name of the management unit from the management unit information, wherein the second part is different from the first part.

3. The management unit existence determination system according to claim 1, wherein the part of the name of the management unit is at least one of first and last elements of the name of the management unit.

4. The management unit existence determination system according to claim 1,
   wherein the management unit includes one or more groups,
   wherein each of the one or more groups includes one or more elements, and wherein the second query set includes in one of the first and last elements of a group of the one or more groups from the management unit information.

5. The management unit existence determination system according to claim 1,
wherein the management unit includes one or more groups,
wherein each of the one or more groups includes one or more elements, and
wherein a first element of the group of the one or more groups is a specific element,
wherein the second query set includes a partially changed management unit information which has been changed in a second element next to the first element of the group of the one or more groups from the management unit information.

6. The management unit existence determination system according to claim 1,
wherein the management unit includes one or more groups,
wherein each of the one or more groups includes one or more elements, and
wherein a last element of the group of the one or more groups is a specific element,
wherein the second query set includes a partially changed management unit information which has been changed in a last second element next to the last element of the group of the one or more groups from the management unit information.

7. A management unit existence determination method comprising:
transmitting a first query and a second query set to a determination target apparatus, wherein the first query including a management unit information which indicates a management unit of a file management system, the file management system being configured to respond to the first query and the second query set in response to at least a part of a name of the management unit, the first query is to confirm the existence of the management unit of the file management system;
receiving a response to the first query and a response to the second query set from the determination target apparatus;
comparing the response to the first query with the response to the second query set; and
determining the existence of the management unit based on a result of the comparison,
wherein the second query set comprises a first comparative query and a second comparative query,
wherein if the name of the management unit, which position is indicated by a management unit position information of the management unit information, has a series of characters and does not include a special character dot "." at a first character position and includes the special character dot "." at a second or subsequent character position, then the first comparative query has an alphanumerically-changed character which is positioned before the special character dot ".", and the second comparative query has an alphanumerically-changed character which is positioned after the special character dot ".",
wherein if the name of the management unit includes the special character dot "." at the first character position, then the first comparative query has an alphanumerically-changed character which is positioned at a second or subsequent character position, and the second comparative query has an alphanumerically-changed character which is positioned closest to a last character position,
wherein if the name of the management unit does not include the special character dot "." at any positions, then the first comparative query has an alphanumerically-changed character which is positioned at a first alphanumerical character position, and the second comparative query has an alphanumerically-changed character which is positioned at a last alphanumerical character position,
wherein comparing the response to the first query with the response to the second query set comprises performing a first comparison and a second comparison, the first comparison is to compare the first query with the first comparative query to determine whether the first query is identical in its feature with the first comparative query, and the second comparison is to compare the first query with the second comparative query to determine whether the first query is identical in its feature with the second comparative query,
wherein determining the existence of the management unit comprises determining that the management unit exists if the first query is not identical in its feature with the first comparative query and the first query is not identical in its feature with the second comparative query,
wherein the alphanumerically-changed character is an alphanumerical character which is changed from an alphanumerical character.

* * * * *